United States Patent [19]

Edgerton

[11] Patent Number: 5,245,744
[45] Date of Patent: Sep. 21, 1993

[54] METHOD FOR PLACING BRAILLE LETTERS ON ARCHITECTURAL SIGNS

[76] Inventor: David A. Edgerton, 1146 - 56th St., Des Moines, Iowa 50311

[21] Appl. No.: 859,935

[22] Filed: Mar. 30, 1992

[51] Int. Cl.⁵ .......................................... B23P 19/02
[52] U.S. Cl. .................................................. 29/525
[58] Field of Search ........................ 29/451, 432, 525; 400/122; 434/113, 114, 115

[56] References Cited

U.S. PATENT DOCUMENTS

| | | | |
|---|---|---|---|
| 3,132,962 | 5/1964 | Seymour | 434/113 |
| 4,571,190 | 2/1986 | Zagler et al. | 434/114 |
| 4,586,904 | 5/1986 | Chlumsky | 434/114 |
| 4,650,352 | 3/1987 | Eriksson | 434/113 X |
| 4,772,205 | 9/1988 | Chlumsky et al. | 434/114 |
| 5,161,975 | 11/1992 | Andrews | 434/113 |

FOREIGN PATENT DOCUMENTS

1042166 10/1953 France .................. 434/113

OTHER PUBLICATIONS

Letter dated Mar. 5, 1992 from the inventor David A. Edgerton identifying prior art and comparing it with the instant invention (3 pages).

Brochure (1992) of Scott Sign Systems, Inc. entitled Signage Ada Americans With Disabilities Act.
Brochure (1991) of New Hermes Incorporated entitled The Vanguard Series-Computerized Engraving Systems.

Primary Examiner—Timothy V. Eley
Attorney, Agent, or Firm—Henderson & Sturm

[57] ABSTRACT

A method and apparatus are disclosed for placing braille letters on an architectural sign face by drilling holes in the sign corresponding to the pattern of braille letters designed to be formed in the sign and then inserting ball bearings or the like in each opening and securing them either by friction or glue in each respective hole to form the braille letters desired. A device is disclosed for drilling the holes by using a template for accurately placing the holes in a desired place on the sign face in an arrangement desired, for accurately duplicating braille letters. Another device is disclosed for pneumatically grasping ball bearings or the like and facilitating forcing these ball bearings or the like into the holes formed in the sign face whereby braille letters are formed in the sign face.

3 Claims, 4 Drawing Sheets

METHOD FOR PLACING BRAILLE LETTERS ON ARCHITECTURAL SIGNS

TECHNICAL FIELD

The present invention relates generally to a method and apparatus for placing braille letters on architectural signs, and more particularly to such a method and apparatus which includes drilling holes corresponding to the pattern of braille letters and then forcing ball bearings or the like into each hole formed.

BACKGROUND ART

Signs in buildings which direct people from place to place sometimes have a message both in print, to be read by sighted people, and in braille to be read by blind people. There has been a general trend toward putting braille on signs, but this trend has been greatly accelerated because of federal legislation requiring that braille be placed on architectural signs, both new and old.

There have been numerous approaches to the problem of how to construct the braille message on an architectural sign. For example, Scott Plastics has created a line of molded, individual character sets with raised dots that either adhere to the sign face directly or are placed into a track system. The product is produced only in black or white. This system is versatile in that it can be used anywhere where aesthetics are of little concern. Custom colors must be applied by spray painting on the small pieces. The mounting is bulky and must be surface applied, which also permits it to be removed by vandals. While it fulfills the function and is cost effective, in the eyes of the architectural signage industry, this product is not entirely satisfactory.

Charleston Industries has technology which uses a metal plate coated with a photo-sensitive emulsion which is stored in a protective environment until use. The manufacturer makes a film positive or negative of the image to be incorporated onto the sign face. The film is overlayed on the photo-sensitive plate and is exposed to a light source. The area blocked out by the film remains soft and is washed away after exposure. The plate is then trimmed, painted and silkscreened or brayer rolled to highlight the raised surface. The steps to produce this product are many and require semi-skilled labor. The equipment required to produce this product is extremely expensive and this constitutes a major drawback to such a system. An advantage of this last mentioned system is that it can incorporate logos and other images, along with the raised braille portion of the sign face, but the major drawback is that the plate must be adhered to a substrate. Another major problem is that people can scrape off the raised braille dots with a fingernail.

Another product used to create architectural signs is a New Hermes Engraver, which is a computer-aided system. This system also is extremely expensive and when finished, the product is similar to the finished look of the Scott Plastics System referred to above. The braille product looks like a plate adhered to the face of the sign. This and the high cost thereof are the major drawbacks to the system.

Also on the market is a product which is a metal strip-like product fed through a machine, similar to a typewriter and wherein the person types the message on a keyboard. The machine strikes the metal strip from behind, pushing a raised dot out on the other side. The strip is then trimmed and adhered to the sign face. The metal strips can be chrome, brass or they can be painted. This, too, is a product made separate from the finished product and is adhered to the sign face upon completion. Consequently, it also can be removed by vandals and the equipment to make it has a high acquisition cost.

Accordingly, there is a need for a method and apparatus for applying braille to a sign face which overcomes the aforementioned problems.

DISCLOSURE OF THE INVENTION

The present invention relates to a method and apparatus for placing braille letters on an architectural sign face by drilling holes in the sign corresponding to the pattern of braille letters designed to be formed in the sign, and then inserting ball bearings or the like in each opening and securing them either by friction or glue in each respective hole to form the braille letters desired.

A device is disclosed for drilling holes in a sign face by using a template for accurately placing the holes in a desired place on the sign face in an arrangement desired for accurately duplicating braille letters. Another device is disclosed for pneumatically grasping ball bearings or the like and facilitating forcing these ball bearings or the like into the holes formed in the sign face, whereby braille letters are formed in the sign face.

An object of the present invention is to provide an improved method and apparatus for placing braille letters on an architectural sign face.

Another object of the present invention is to provide a simple and attractive braille lettering system for architectural signs.

A still further object of the present invention is to provide a method and apparatus for placing braille letters on an architectural sign face which is inexpensive and yet which produces a sign which is extremely durable, exceptionally vandal resistant and which is simple to use.

A still further object of the present invention is to provide a method of placing braille letters on a sign face which involves drilling holes in the sign face corresponding to the pattern of braille letters desired to be formed in the sign and then forcing ball bearings or the like into each of the holes to provide the braille letters.

A still further object of the present invention is to provide an apparatus for easily, quickly and dependably forming holes in a sign face for receiving the aforementioned ball bearings or the like.

A still further object of the present invention is to provide a simple and dependable apparatus for inserting ball bearings into the holes formed in the sign face by the aforementioned apparatus.

Other objects, advantages, and novel features of the present invention will become apparent from the following detailed description of the invention when considered in conjunction with the accompanying drawings.

BEST MODE FOR CARRYING OUT THE INVENTION

Figure 1:
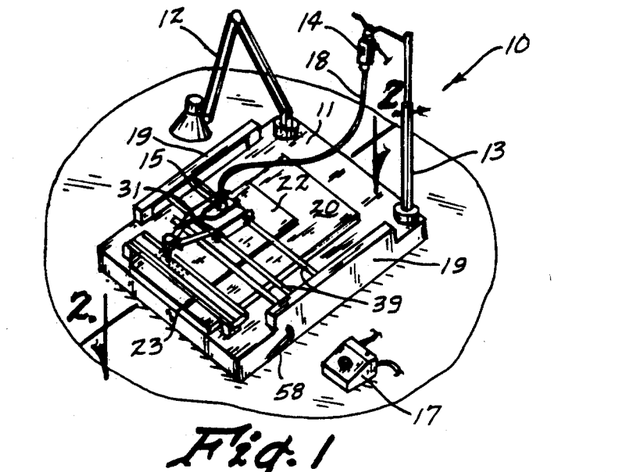
FIG. 1 is a perspective view of an apparatus constructed in accordance with the present invention for drilling holes in an architectural sign face in the pattern of braille letters for later receiving ball bearings or the like to finish the sign face and to form the braille letters desired.

Referring now to the drawings wherein like reference numerals designate identical or corresponding parts throughout the several views, FIG. 1 shows an apparatus (10) constructed in accordance with the present invention for accurately drilling blind holes in a sign face in a pattern corresponding to braille letters so that ball bearings or the like can be inserted therein as shown in FIGS. 10-16 to produce a sign face with braille lettering in addition to the normal printed lettering.

Figure 8:
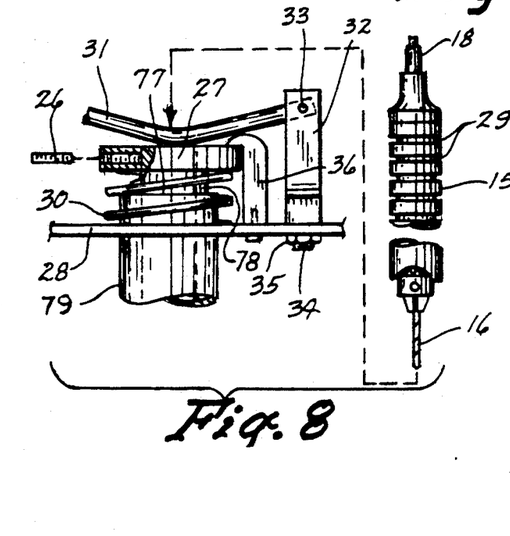
FIG. 8 is an enlarged and exploded view of the drill bit and its biasing and lifting mechanism taken along line 8—8 of FIG. 6.

The apparatus (10) shown in FIG. 1 includes a frame (11) having an optional light attached thereto by attaching mechanism (12) and an upstanding post (13) for telescopically holding a motor (14) for turning a drill (15) shown in FIG. 8 to turn a drill bit (16). A rheostat (17), shown in FIG. 1, is operably attached to the motor (14) and through a flexible drive (18) and can be used to vary the speed of rotation of the drill bit (16) as is well known. Of course the rheostat (17) is typically powered by 110-volt house current for example. The frame (11) includes frame (11A) and (11B) which are covered by housing (19).

A platform (20) is attached to the frame (11) and has a guide portion (21) on one side thereof for receivably aligning a rectangular sign (22), for example. It will of course be understood that the sign (22) can be of other shapes if desired. Another guide member (23) extends upwardly on the front of the frame (11) for also receiving another portion of the sign and positioning it properly with respect to the frame (11).

Figure 3:
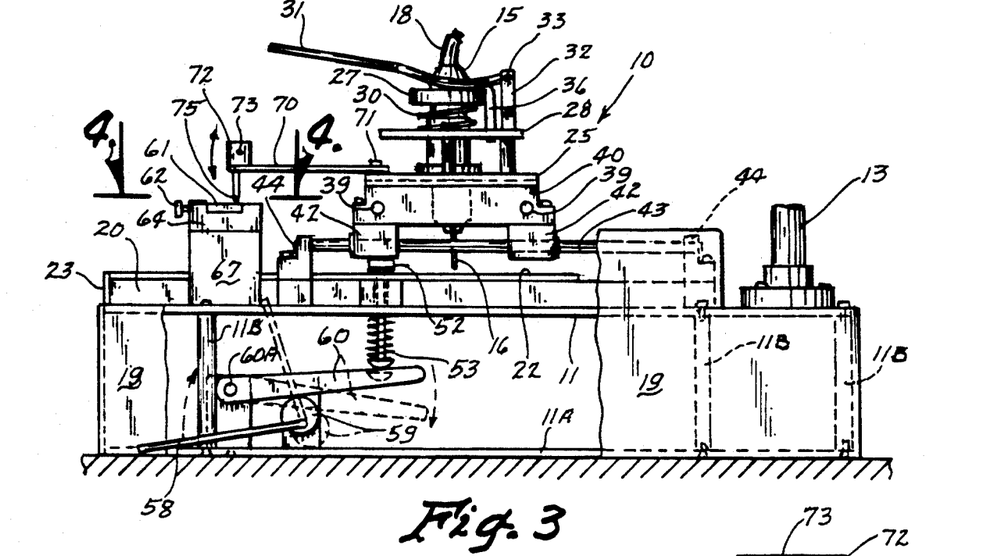
FIG. 3 is a cross sectional view taken along line 3—3 and having a portion of the housing removed to show the hold-down mechanism.

Referring to FIG. 3, the housing (25) is shown for holding a drill (15) shown in FIG. 8. The drill (15) can be positioned with respect to the housing (25) by a set screw (26) extending into a member (27) shown in FIG. 8 whereby the set screw (26) would extend into any one of a plurality of annular notches (29) in the drill housing (15). This adjusts the depth that the bit (16) will drill into the sign (22).

A compression spring (30) shown in FIG. 8 biases the member (27) and thereby the drill (15) and drill bit (16) upwardly to the position shown in FIG. 3 wherein the drill bit (16) is disposed above the sign (22). A handle (31) is pivotally attached to members (32) by pins (33). The yoke members (32) are connected rigidly to the frame (11), for example by threaded fasteners including a bolt (34) extending from the yoke (32) and having a nut (35) secured threadably thereon.

A stop member (36) is also bolted rigidly to the frame (11) and has a member on the top thereof for limiting the upper movement of member (27) as can best be seen in FIG. 8. Pushing the handle (31) down will cause the bit (16), while rotating, to drill a hole in the sign (22) whereas releasing the handle (16) will cause the drill bit (16) to move back up to the position shown in FIG. 3. Referring to FIG. 8, downward movement of bit (16) is limited when member (27) strikes top surface (77) of tube (78) cylindrical member (79) telescoping into tube (78).

Figure 2:
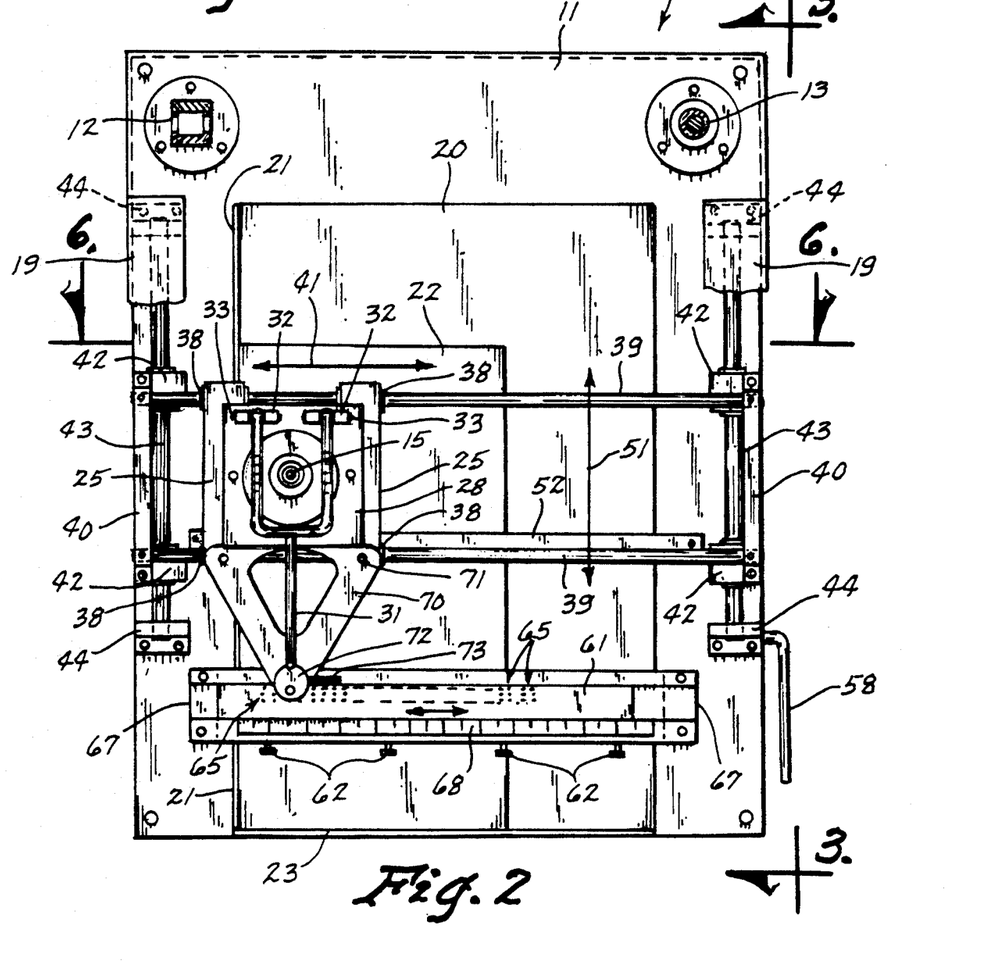
FIG. 2 is a top plan view of the apparatus shown in FIG. 1.

The drill receiving housing (27) is supported by the tube (79) which reciprocates inside tube (78), which is rigidly connected to housing (28). The housing (25) and (28) which ultimately supports the drill (15) is slidable back and forth in the direction (41) shown in FIG. 2 by bearings (38), rigidly secured to the housing (25). This permits the housing (25), the drill (15) and more importantly, the drill bit (16) to be positioned anywhere left to right as viewed in FIG. 2 over the top of the sign (22). The rods (39) onto which the housing (25) is translatable left and right are secured at the ends to members (40).

The members (40) are rigidly attached to bearing members (42), which slide on rods (43). These rods (43) are rigidly secured to the frame (11) at the ends thereof by structures (44). Consequently, the housing (25) can be moved anywhere in the direction of the arrow (51), which is perpendicular to the direction, (41) by moving the housing (25), and the rods (39) and members (40) through bearings (42), forwardly or backwardly in the direction of the arrow (51) in FIG. 2. Because of the combination of movement in these two directions, the drill bit (16) can be positioned directly above any point on the top surface of the sign (22) shown in FIG. 2.

Figure 6:
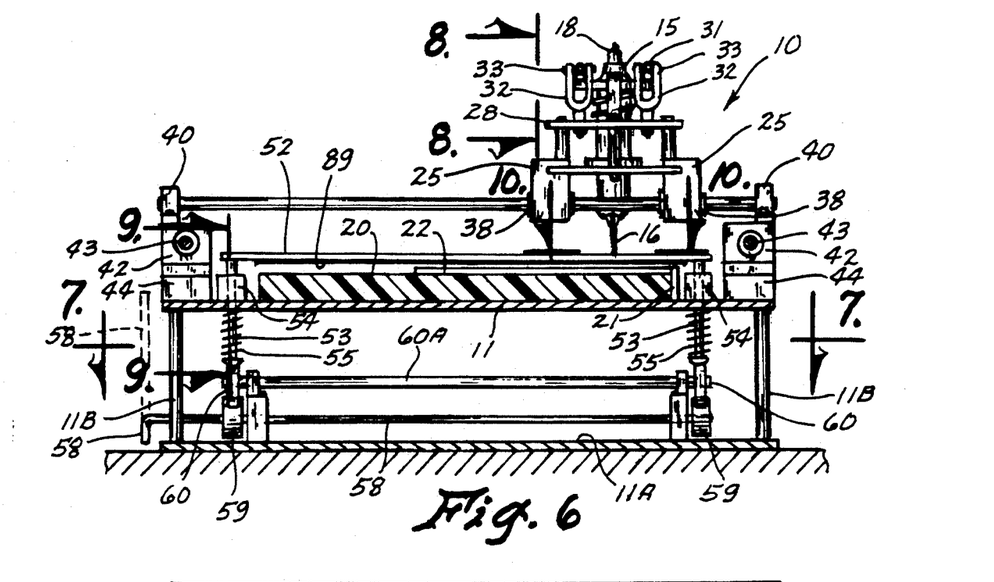
FIG. 6 is a cross sectional view taken along line 6—6 of FIG. 2.
Figure 7:
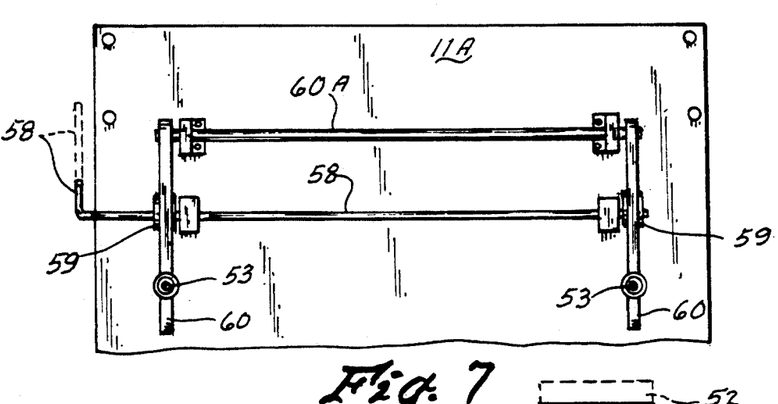
FIG. 7 is a cross sectional view taken along line 7—7 of FIG. 6.

Referring to FIG. 3, it is noted that a hold-down bar (52) extends across the top of the frame and has an upper position shown in solid lines in FIG. 3 whereby the sign (22) can move with respect to the platform (20) on which it rests. The hold-down bar (52) is attached to posts (53). The hold-down bar (52) can reciprocate up and down with respect to the frame (11), through openings in frame (11) and through bearing members (54) shown in FIG. 6.

Figure 9:
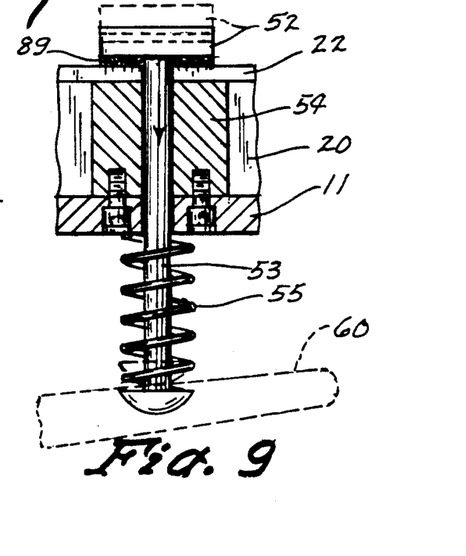
FIG. 9 is a cross sectional view taken along line 9—9 and showing an enlarged view of the hold-down mechanism, the biasing mechanism and the mechanism used to overcome the biasing of the hold-down device.

The enlarged head on posts (53) are in abutment with compression springs (55), which springs (55) are also in abutment with the bottom of the frame (11). Consequently, the hold-down bar (52) is biased to the position shown in dashed lines in FIG. 3 to automatically hold the hold-down bar (52) against the sign (22). Typically and preferably, the hold-down bar (52) has felt (89) on the underside thereof to prevent damage to the sign face (22) (see FIG. 9). So while the hold-down mechanism through the biasing springs (55) will automatically hold the sign (22) in the position shown in FIG. 2, when it is desired to move the sign (22), the handle (58) shown in FIG. 3 is merely pivoted to the position shown in solid lines in FIG. 3 and this will rotate a cam (59) to pivot upwardly the lever (60), which will push the shaft (53) and consequently the hold-down bar (52) to the upward position shown in FIG. 3. The dashed line position shown in FIG. 3 is the position in which these members assume when the hold-down bar (52) is holding the sign (22) in position for use. The handle (58) consequently will assume an upward position and the members (60) and (53) a downward position when the hold-down bar (52) is holding the sign (22) securely down in the position shown in FIG. 9.

Figure 4:
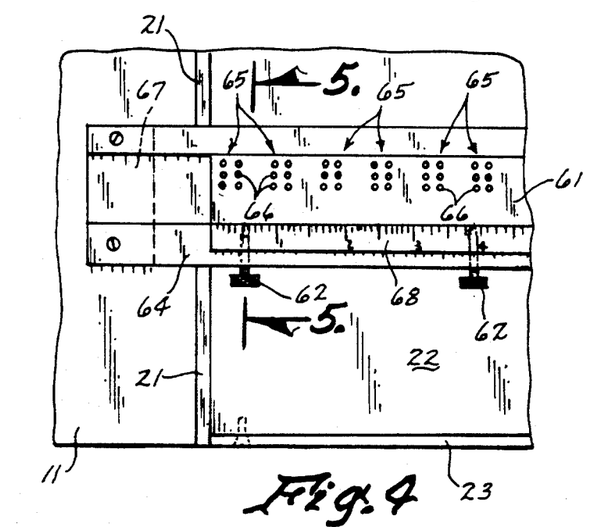
FIG. 4 is an enlarged view taken along line 4—4 of FIG. 3 of FIG. 2, and showing a template for reproducing braille letters and also showing a linear measuring device associated therewith.
Figure 5:
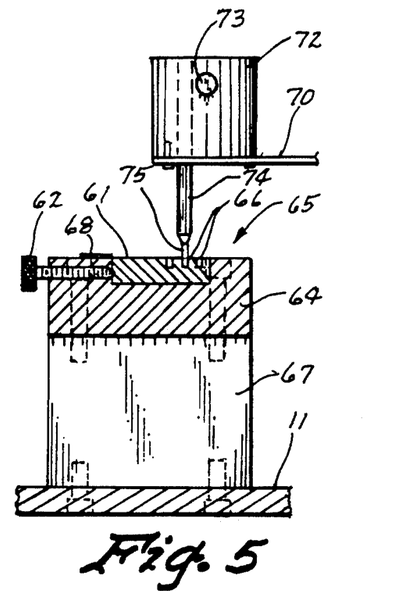
FIG. 5 is an enlarged cross sectional view taken along line 5—5 of FIG. 4 and showing a positioning mechanism whereby a pin extends into chosen ones of the template openings to position the drill bit shown in FIG. 3 in a corresponding manner.

Referring now to FIGS. 4 and 5, it is noted that a template (61) is held in place by set screws (62). The template (61) consequently can be adjusted left or right within the slot in member (64). This member (64) is secured rigidly with respect to the frame (11). The template (61) can be changed if the spacing of the braille is to be changed or the spacing between braille letters is to be changed. Referring back to FIG. 4, it is noted that a plurality of sets (65) of six braille dots are shown disposed in the template (61) and are evenly spaced apart. All of the letters of the alphabet and numbers can be formed by each set (65) of these openings which are each numbered (66) as shown in FIG. 5.

A spring steel member (70) is rigidly secured at one end thereof by fastener (71) to the housing (25). The other end of the spring steel member (70) is secured to a member (72) having a handle (73) disposed thereon and a downwardly extending pin (74) having a reduced portion (75) thereon. This portion (75) is of a size to fit the size of the opening (66). Consequently, if different sized openings (66) are used, then different pins (74) would be used which have a reduced lower diameter precisely the right size to correspond to the size of the opening (66) in corresponding template (61).

In operation, in order to practice the invention, a sign (22) would be grasped. At the same time, the lever (58) would be pushed down to the position shown in FIG. 3 so the sign (22) could be slid under the hold-down bar (52). While holding the lever (58) in the downward position, the sign (22) would be abutted against the front guide (23) and the side guide (21) so that after the sign (22) is in the position shown in FIG. 2, the handle (58) can be released. This will cause the hold-down bar (52) to move to the dashed line position shown in FIG. 3 whereby the compression springs (55) will automatically, securely and frictionally hold the hold-down bar (52) against the sign (22). The template (61) will be chosen, depending upon the size and spacing of the braille lettering to be imposed upon the sign (22) and it will also be adjusted as to spacing by using set screws (62). Referring to FIG. 4, it is noted that it would typically be aligned as shown with a linear measuring device (68) being shown for measuring typically in either inches or in centimeters.

Figure 10:
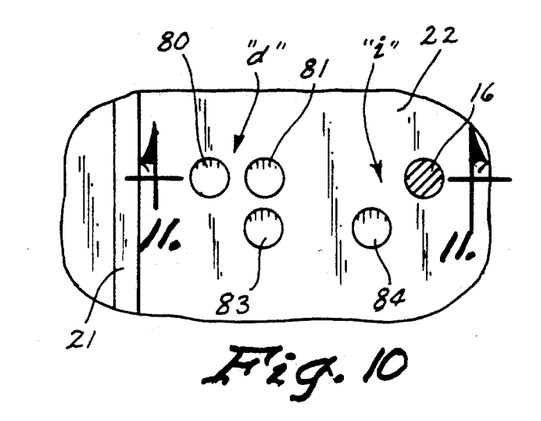
FIG. 10 is an enlarged view taken along line 10—10 of FIG. 6 showing how the holes are formed in the sign face with one dot having a bit drilling holes in the sign face.
Figure 11:
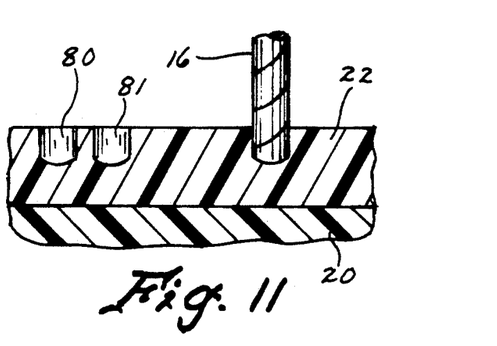
FIG. 11 is an enlarged cross sectional view taken along line 11—11 of FIG. 10.

Assuming for example that all of the letters are to be used as shown in FIG. 4, and that the first two letters are to be "d" and "i", then the letter "d" would be formed as the first letter shown in FIG. 10 by inserting the pin (75) into the top left opening (66) in the first set (65) of template dots and once in position, handle (31) would be pulled down so that the rotating bit (16) will drill the first hole (80) in the sign (22). Then the member (72) would be raised so that the pin (75) lifts out of the opening (66) just discussed.

The pin (75) would then be inserted into the top right hole (66) of the leftmost set (65) of dots in the template (61). Once so positioned, the handle (31) would be pivoted downwardly so that the rotating bit (16) would form hole (81) in the sign (22) as shown in FIG. 10. After that is finished, the handle (31) released so that the drill bit (16) is again raised to the FIG. 3 position. Then the pin (75) is raised and moved over and into the middle dot on the right side of the same set (65) of template holes so that when the handle (31) is lowered again, rotating bit (16) will form the hole (83) shown in FIG. 10. Consequently, the pattern shown in FIG. 10 for the leftmost dot is the letter "d".

To form the letter "i", a similar procedure is accomplished with the set of template depression (65), which is the second left shown in FIG. 4. To form the letter "i", it can be seen that after the middle left dot of the sixth hole template (65) is used to form hole (84), the drill bit (16) is forming the hole for the second hole necessary to form the pattern over the letter "i". This sequence would be continued whereby the template (61) is used as a guide and as the pin (75) is moved, the drill bit (16) will be positioned accordingly because it is attached thereto. After all of the holes are drilled into the sign (22), the sign (22) is removed by releasing the hold-down plate (52) as previously described in removing the sign (22). Then the ball bearings (90) shown in FIGS. 13-16 can be inserted, one in each hole which has been formed.

Figure 12:
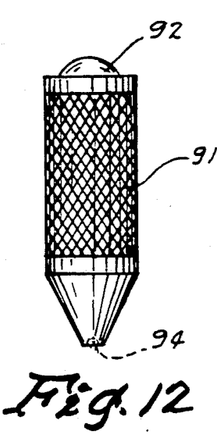
FIG. 12 is a view of a mechanism for picking up ball bearings and forcing them into the openings shown in FIG. 10.
Figure 13:
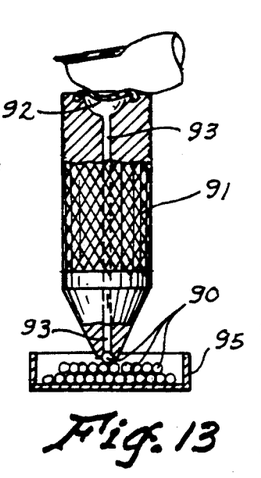
FIG. 13 shows the ball bearing pick-up and inserting mechanism shown picking up a ball bearing.
Figure 14:
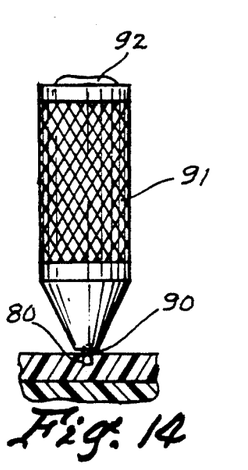
FIG. 14 shows how the ball bearing is inserted into an opening in the sign face.
Figure 15:
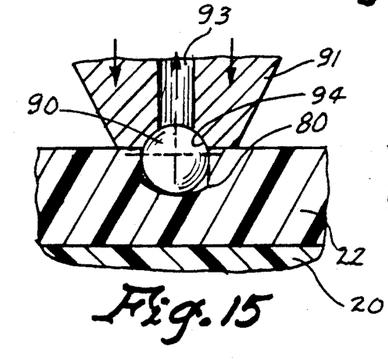
FIG. 15 is an enlarged cross sectional view of the device as shown in FIG. 14 wherein the ball bearing can be forced into an opening so that more than half of the ball bearing extends into the opening and whereby the widest part of the ball bearing will be in frictional engagement with the walls forming the holes in the sign face and whereby each ball bearing will be inserted to exactly the same depth thereof in the holes in the sign face.

A cylindrical device (91), shown in FIG. 12, has a rubber diaphragm (92) sealed thereon and has an opening (93) extending therethrough down to a partially inverted spherical surface (94) shown in FIG. 15.

Figure 16:
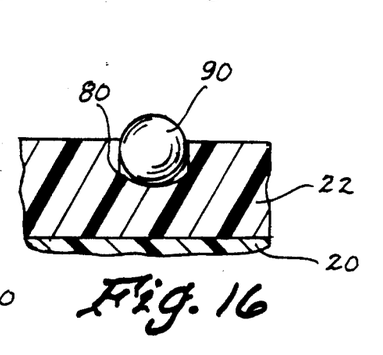
FIG. 16 shows the final positioning of each ball bearing in each respective opening in the sign face.

To utilize the device (91) shown in FIG. 12, a user would first depress the diaphragm (92) at the top and then stick the pointed end of the device (91) into a container (95) having a supply of small ball bearings (90). Once a ball bearing is in the position shown in FIG. 13, the user will release the user's finger from the diaphragm (92), which will hold the ball (90) securely in the end of the hole (93) similar to the way that liquid can be held in a straw by holding one's tongue over one end of the straw with liquid therein. With the ball bearing (90) so held, it can be positioned over a hole (80), for example, as shown in FIGS. 15 and 16. Then, the ball bearing (90 is pushed securely into the opening (80) whereby the center of the ball bearing will be below the top surface of the sign (22) and whereby more than half of the ball bearing (90) will extend into the opening (80). By choosing a ball bearing (90) which is just slightly larger than the diameter of the opening (80), friction will hold the ball bearing (90) in place in the position shown in FIG. 16. Also, by making more than half of the ball bearing (90) fit into the opening (94), this ensures that the ball bearing (90) will always be placed in the relative position shown in FIG. 16. This procedure is continued until all of the holes formed in the sign (22) are filled with ball bearings (90), thus completing the process.

Accordingly, it will be appreciated that the present invention does indeed accomplish the aforementioned objects. Obviously, many modifications and variations of the present invention are possible in light of the above teachings. For example, the ball bearing inserting device (91) can be changed by merely attaching a hose connected to a vacuum producing device, rather than using the diaphragm (92). It is therefore to be understood that, within the scope of the appended claims, the invention may be practiced otherwise than as specifically described.

I claim:

1. A method of placing braille letters on an architectural sign face comprising:

drilling blind holes of a given depth in a sign corresponding to the pattern of braille letters desired to be formed in said sign; and fastening a separate member of a given height into each of said blind holes so that each separate member extends said given depth into each respective one of said blind holes and each separate member extends at least partially outwardly from said blind hole approximately the same distance as each of the other members extends at least partially outwardly from other respective blind holes in which they are disposed.

2. The method of claim 1 wherein said fastening step includes forcing said members into said blind holes; wherein, the width of each of said members are slightly larger than the diameter said holes thereby frictionally holding said members in place with respect to said sign.

3. The method of claim 2 wherein said fastening step includes forcing a respective one of said members in the shape of a sphere into each respective one of said blind holes to an extent greater than the radius of said respective sphere whereby less than half of each of said respective spheres extends from each one of said respective holes and the widest portion of said sphere is in contact with interior walls forming each of said respective holes.

* * * * *

(12) EX PARTE REEXAMINATION CERTIFICATE (7670th)
United States Patent
Edgerton (10) Number: US 5,245,744 C1
(45) Certificate Issued: Aug. 10, 2010

(54) METHOD FOR PLACING BRAILLE LETTERS ON ARCHITECTURAL SIGNS

(75) Inventor: David A. Edgerton, Des Moines, IA (US)

(73) Assignee: Accent Signage Systems, Inc., Minneapolis, MN (US)

Reexamination Request:
No. 90/009,641, Dec. 24, 2009

Reexamination Certificate for:
Patent No.: 5,245,744
Issued: Sep. 21, 1993
Appl. No.: 07/859,935
Filed: Mar. 30, 1992

(51) Int. Cl.
*B23P 19/02* (2006.01)

(52) U.S. Cl. .......................................... 29/525
(58) Field of Classification Search ............... 29/451, 29/432, 525; 400/122; 434/113, 114, 115
See application file for complete search history.

(56) References Cited

U.S. PATENT DOCUMENTS

| 4,500,293 A | 2/1985 | Eltgen |
| 4,573,926 A | 3/1986 | Okada |

*Primary Examiner*—Jeffrey R. Jastrzab (57) ABSTRACT

A method and apparatus are disclosed for placing braille letters on an architectural sign face by drilling holes in the sign corresponding to the pattern of braille letters designed to be formed in the sign and then inserting ball bearings or the like in each opening and securing them either by friction or glue in each respective hole to form the braille letters desired. A device is disclosed for drilling the holes by using a template for accurately placing the holes in a desired place on the sign face in an arrangement desired, for accurately duplicating braille letters. Another device is disclosed for pneumatically grasping ball bearings or the like and facilitating forcing these ball bearings or the like into the holes formed in the sign face whereby braille letters are formed in the sign face.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

* * * * *